July 3, 1951 A. H. RZEPPA 2,559,093
TORQUE TRANSMITTING ANGLE COUPLING
Filed May 9, 1949 2 Sheets-Sheet 1
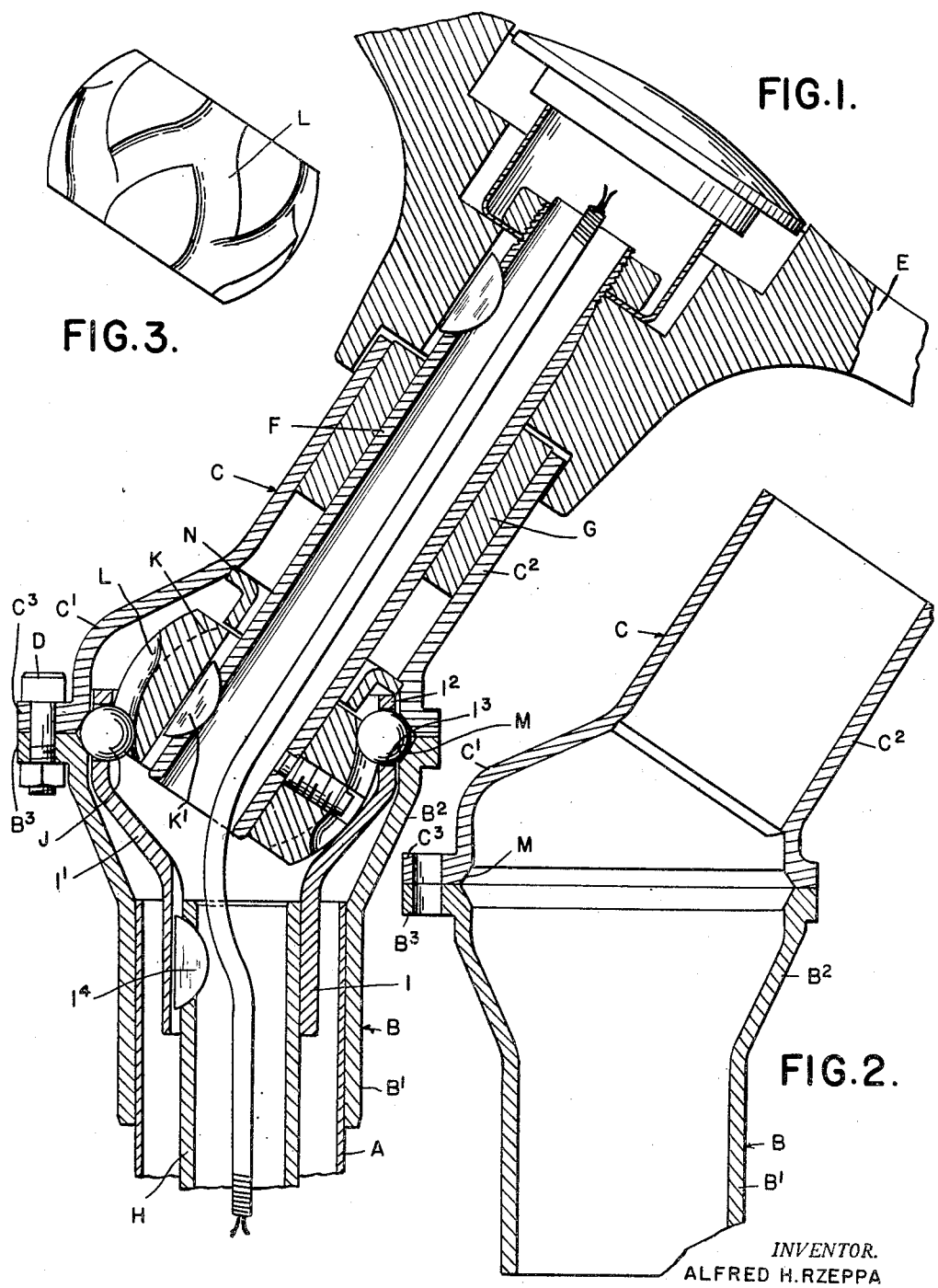
INVENTOR.
ALFRED H. RZEPPA
BY
Whittemore Hulbert & Belknap
ATTORNEYS July 3, 1951     A. H. RZEPPA     2,559,093
TORQUE TRANSMITTING ANGLE COUPLING Filed May 9, 1949     2 Sheets-Sheet 2

*INVENTOR.*
ALFRED H. RZEPPA
BY
Whittemore Hulbert & Belknap
ATTORNEYS

Patented July 3, 1951

2,559,093

UNITED STATES PATENT OFFICE 2,559,093

TORQUE TRANSMITTING ANGLE COUPLING

Alfred H. Rzeppa, Grosse Pointe, Mich.

Application May 9, 1949, Serial No. 92,120

3 Claims. (Cl. 74—380)

The invention relates to constant velocity torque transmitting angle couplings, and has for its object the obtaining of a construction more particularly adapted for use in coupling shafts which are in fixed angular relation to each other. To this end the invention consists in the construction as hereinafter set forth.

In the drawings I have illustrated one specific use for my improved universal joint viz., for connecting an obliquely arranged steering wheel for a motor vehicle with a stem extending through a vertical post. Such arrangement is useful on buses and on other vehicles where the space for the operator and steering mechanism is limited.

Fig. 1 is a vertical central section through a portion of a steering wheel and post showing my improved angle coupling in connection therewith;

Fig. 2 is a similar section through the housing with the mechanism removed;

Fig. 3 is a side elevation of the driving member of the angle coupling;

Figure 5:
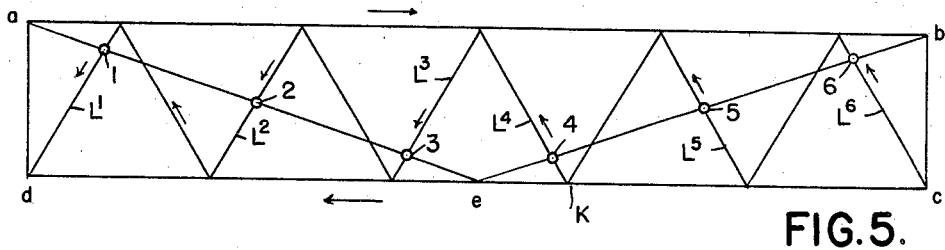
Fig. 5 is a diagram showing a development of the peripheral surface of the member 3 and its relation to the torque transmitting elements.
Figure 4:
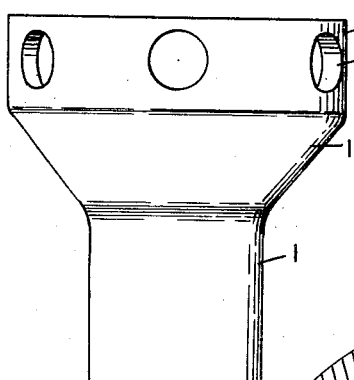
Fig. 4 is an elevation of the driven member.

As illustrated in Figures 1 and 2, the post or outer tubular column member A of the steering mechanism has mounted on its upper end a housing formed of members B and C. The member B has a portion B' fitting about the post A and an upwardly flaring or enlarged portion $B^2$ which terminates in a horizontal plane. The member C rests upon the member B having a portion C' forming an upward extension of the enlarged chamber within the member B and a portion $C^2$ which extends upward at an oblique angle to the post. The members B and C are secured to each other by bolts D passing through adjacent lugs or flanges $B^3$ and $C^3$. The steering wheel E is mounted above the portion $C^2$ and has a hollow stem F extending through the latter and revolubly mounted in a bearing G therein. The stem F extends downward into the enlarged chamber within the portions $B^2$, C, upon opposite sides of the meeting plane of these portions. A vertical steering stem H extends upward centrally within the post member A, and the two stems are connected to each other by my improved constant velocity torque transmitting angle coupling which is of the following construction.

Mounted on the stem H is a hollow member I having a flaring upper portion I' terminating in a cylindrical portion $I^2$, the latter being provided with a series of equispaced apertures $I^3$ therein located in the meeting plane of the members C and D, which plane passes through the point of intersection of the axes of the stems F and H. Within each of the apertures $I^3$ is a ball J, which balls project radially inward and form in effect teeth of an internal gear. K is a member mounted on the stem F and having toothed peripheral portions which intermesh with the balls J on diametrically opposite sides of the series. As illustrated in Figure 1, the member K has its periphery forming a zone of a sphere and a circumferentially extending zigzag groove L is formed in this portion to engage the balls J. The longitudinal contour of this groove is such that the equispaced balls will travel therethrough successively engaging the oppositely angling portions of the zigzag and, at the same time, the balls will transmit torque from the member K to the member I. Furthermore, the contour of one portion of each zigzag is substantially normal to the plane of the balls at all points crossing said plane. To take care of the radial thrust on the balls, a raceway M is formed in the adjacent portions of the housing members B and C around which the balls travel during rotation of the shafts. The direction of travel of the balls in the groove L is reversed from the direction of rotation of the members K and I so as to form in effect a stepdown gearing, the member K revolving more than a revolution for each revolution of the member I. With the proportion of parts as specifically shown in Figure 1, the ratio is six to five there being six balls and only five complete zigzag portions of the groove, but this specific ratio is not essential. A key K' transmits torque from the stem F to the member K and a key $I^4$ similarly transmits torque from the member I to the stem H. An annular member N surrounding the stem F within the housing member D forms an end thrust bearing for the member K.

Figure 6:
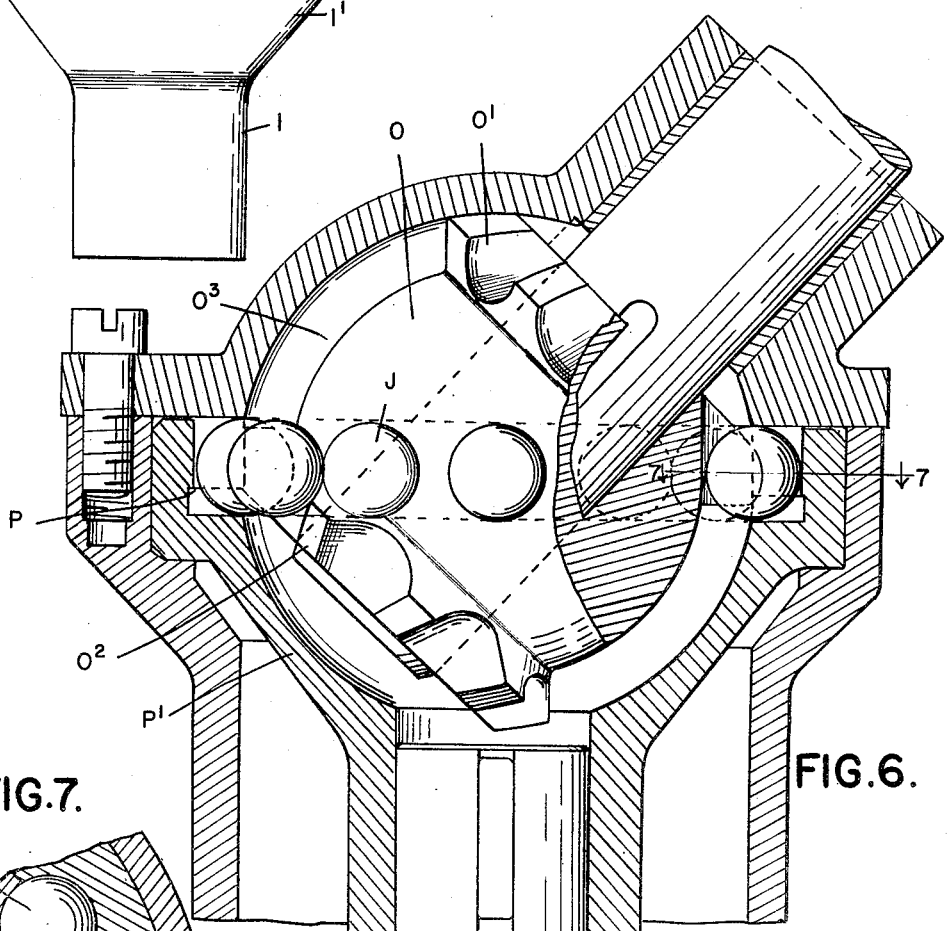
Fig. 6 is a section similar to Fig. 1 showing a modified construction.
Figure 7:
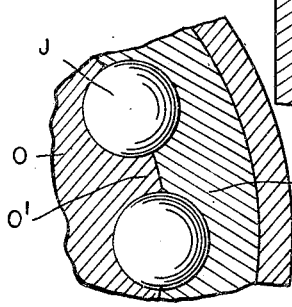
Fig. 7 is a section on the line 7—7, Fig. 6.

In the modified construction illustrated in Fig. 6 instead of forming the member K with a zigzag groove in its periphery, a member O is provided with two longitudinally spaced toothed portions O' and $O^2$ which intermesh with the balls J on diametrically opposite sides of the series. Intermediate these toothed portions is a spherical zone $O^3$ which holds the balls from radial inward movement when passing between said toothed portions. Another modified feature of the construction in Figure 6 is that the balls are seated in grooves P in the member P', which is mounted on the stem H instead of passing through apertures in said member into engagement with the raceway.

With both constructions shown respectively in Fig. 1 and Fig. 6, as well as in other modifications, the torque transmission is at constant velocity but the ratio of rotation of the drive and driven members is not one to one. Also in the construction shown in Fig. 1, the general helix angle of the groove L is approximately equal to the minimum angle between the axis of the stem F and the plane of the balls.

In the diagram Fig. 5, a development of the peripheral surface of the member K is indicated by the rectangle abcd. This is not a true development for a spherical surface can not be developed into a plane, but the diagram indicates the relation of the balls in their plane of rotation to the zigzag groove. Thus the lines $ae$ and $eb$ represent the plane of travel of the balls on opposite sides of the member K, and the lines $L'$, $L^2$, etc., represent the portions of the zigzag which are normal to said plane. The full line arrow indicates the direction of rotation of the member K, which is from left to right, while the direction of travel of the balls in the zigzag groove is also indicated by arrows. The general direction of travel of the balls is indicated by the dotted arrow, which is the reverse of that of the member K or from right to left. The balls are designated by the numerals 1, 2, 3, 4, 5, 6, but it will be noted that there are only five complete zigzags. Thus the ratio of rotation of the member K to the member I, both in the same sense of rotation, is six to five.

What I claim as my invention is:

1. The combination with driving and driven rotary members having intersecting axes at a fixed oblique angle to each other, of a constant velocity torque transmitting coupling between said members, comprising a hollow member mounted on one of said driving and driven members having an annular portion provided with a series of equispaced radial cylindrical sockets extending through the wall thereof with their axes in a constant plane perpendicular to the axis of said hollow member and passing through the point of intersection of the two axes, a ball located in each socket to project radially inward and outward therefrom, a member mounted on the other of said driving and driven members extending into said hollow member and having toothed portions respectively intermeshing with said balls on diametrically opposite sides of said driven member, and a housing enclosing said universal joint having a raceway for said balls in the plane of rotation thereof.

2. The combination with a pair of rotary driving and driven members having intersecting axes at a fixed oblique angle to each other, of a constant velocity torque transmitting coupling between said members, comprising a hollow member secured to one of said driving and driven members provided with an annular series of teeth concentric with the axis of said member and in a plane perpendicular thereto, and a spherical member mounted on the other of said driving and driven members extending into the space within said hollow member and having a circumferentially extending zigzag groove in a zone of its spherical surface engaging said teeth and fashioned to permit free travel of said teeth therethrough in one direction rotatably of said member while transmitting torque in the opposite direction of rotation.

3. The combination with a pair of rotary driving and driven members having intersecting axes at a fixed oblique angle to each other, of a constant velocity torque transmitting coupling between said members, comprising a hollow member mounted on one of said driving and driven members having an annular portion provided with a series of equispaced sockets extending therethrough in a plane perpendicular to its axis passing through the point of intersection of the two axes, a spherical member mounted on the other of said driving and driven members extending into said hollow member and provided with a circumferentially extending zigzag groove in a zone of its spherical surface, balls engaging said sockets projecting radially inward into said groove, the contour of said groove being such as to permit travel of said balls therethrough in one direction rotatably of said member while transmitting torque in the opposite direction of rotation, and a housing for said universal joint provided with a raceway for engaging outwardly projecting portions of said balls during rotation of said members.

ALFRED H. RZEPPA.

REFERENCES CITED

The following references are of record in the file of this patent:

UNITED STATES PATENTS

| Number | Name | Date |
|---|---|---|
| 1,094,603 | Scott | Apr. 28, 1914 |
| 2,006,026 | Midthun | June 25, 1935 |
| 2,099,848 | Grodhaus | Nov. 23, 1937 |
| 2,182,455 | Smith | Dec. 5, 1939 |
| 2,453,279 | Starbuck | Nov. 9, 1948 |
| 2,453,964 | Betz | Nov. 16, 1948 |